(12) United States Patent
Nielsen et al.

(10) Patent No.: US 8,960,117 B2
(45) Date of Patent: Feb. 24, 2015

(54) METHOD AND APPARATUS TO FACILITATE CLEANING MARINE SURVEY EQUIPMENT

(75) Inventors: Einar Nielsen, Bærum (NO); Kenneth Karlsen, Aalesund (NO); Rune Tønnessen, Lommedalen (NO); Erling Vageskar, Ulsteinvik (NO); Jan Terje Rodseth, Skodje (NO); Arnt M. Bjorno, Alta (NO)

(73) Assignee: PGS Geophysical AS, Oslo (NO)

( * ) Notice: Subject to any disclaimer, the term of this patent is extended or adjusted under 35 U.S.C. 154(b) by 133 days.

(21) Appl. No.: 13/607,119

(22) Filed: Sep. 7, 2012

(65) Prior Publication Data

US 2014/0069313 A1 Mar. 13, 2014

(51) Int. Cl.
*B63G 8/42* (2006.01)

(52) U.S. Cl.
CPC .......................................... *B63G 8/42* (2013.01)
USPC ............................................ 114/244; 367/20

(58) Field of Classification Search
USPC .......... 114/222, 244; 134/6, 9; 367/19, 20, 21
See application file for complete search history.

(56) References Cited

U.S. PATENT DOCUMENTS

| | | | |
|---|---|---|---|
| 3,734,048 A | 5/1973 | Michaelsen | |
| 4,092,858 A | 6/1978 | Edgerton | |
| 4,536,690 A | 8/1985 | Belsterling et al. | |
| 4,821,665 A | 4/1989 | Matthias et al. | |
| 5,947,051 A | 9/1999 | Geiger | |
| 6,276,478 B1 | 8/2001 | Hopkins et al. | |
| 7,145,833 B1 | 12/2006 | Hoogeveen | |
| 7,409,919 B2 | 8/2008 | Hoogeveen et al. | |
| 7,754,018 B2 | 7/2010 | Lepage et al. | |
| 2010/0126403 A1 | 5/2010 | Rooney, III et al. | |
| 2011/0197919 A1 | 8/2011 | Tilley | |
| 2013/0265850 A1 | 10/2013 | Wu | |

FOREIGN PATENT DOCUMENTS

| | | |
|---|---|---|
| GB | 2444604 A | 6/2008 |
| GB | 2488635 A | 9/2012 |
| GB | 2496033 A | 5/2013 |
| WO | 2012039625 A1 | 3/2012 |

OTHER PUBLICATIONS

Goacher, Laura, Patents Act 1977: Search Report under Section 17(5), Oct. 31, 2013, Patents Directorate, Intellectual Property Office, Unite Kingdom.

*Primary Examiner* — Lars A Olson

(57) ABSTRACT

Techniques are disclosed relating to using a remote operated vehicle (ROV) to facilitate cleaning of a submerged geophysical equipment (e.g., a streamer) being towed behind a tow vessel. The ROV may, in one embodiment, attach a streamer cleaning unit (SCU) to the streamer, where the SCU is configured to clean the streamer. In another embodiment, the ROV may facilitate cleaning by cleaning the streamer itself using a cleaning attachment coupled to the ROV.

22 Claims, 6 Drawing Sheets

METHOD AND APPARATUS TO FACILITATE CLEANING MARINE SURVEY EQUIPMENT

BACKGROUND

Background Description

Marine seismic surveys are one type of marine geophysical survey which utilize sound waves transmitted to the earth's crust and reflected back to recording sensors. The recording sensors may be hydrophones in one of a number of streamers that may be towed behind a survey boat. The survey boat may tow an array of multiple streamers in parallel. When towed behind the survey boat, the streamer may be submerged. A sound source may also be towed in the water behind the survey boat for transmitting the sound waves to be received by the hydrophones of the streamers. One common application of marine seismic surveying is oil and gas exploration in marine environments. More particularly, sound waves received during a marine seismic survey may be analyzed to locate hydrocarbon bearing geological structures, and thus determine where deposits of oil and natural gas may be located. In a similar fashion, marine electromagnetic (EM) surveys may be conducted using EM signals transmitted by a submerged antenna and detected by EM receivers.

Periodically, cleaning operations may be conducted on equipment used in marine geophysical surveys. Cleaning operations may be conducted by a crew on a workboat separate from the survey boat. For example, to clean a particular one of the towed streamers, the workboat crew may lift the streamer out of the water, clean by hand, and lower the streamer back into the water. Since the streamers can have significant length, (e.g., 8 km), in some cases only a portion of the streamer is lifted out of the water. The workboat crew may progressively lift portions of a particular streamer out of the water until cleaning is complete. The workboat crew may then progress to the next streamer and repeat the process. The process may be subsequently repeated until all streamers have been cleaned. The process of cleaning using a workboat crew can be very time consuming, and in some cases, dangerous to the crew members that perform the work.

BRIEF DESCRIPTION OF THE DRAWINGS

Other aspects of the disclosure will become apparent upon reading the following detailed description and upon reference to the accompanying drawings which are now described below.

Figure 1:
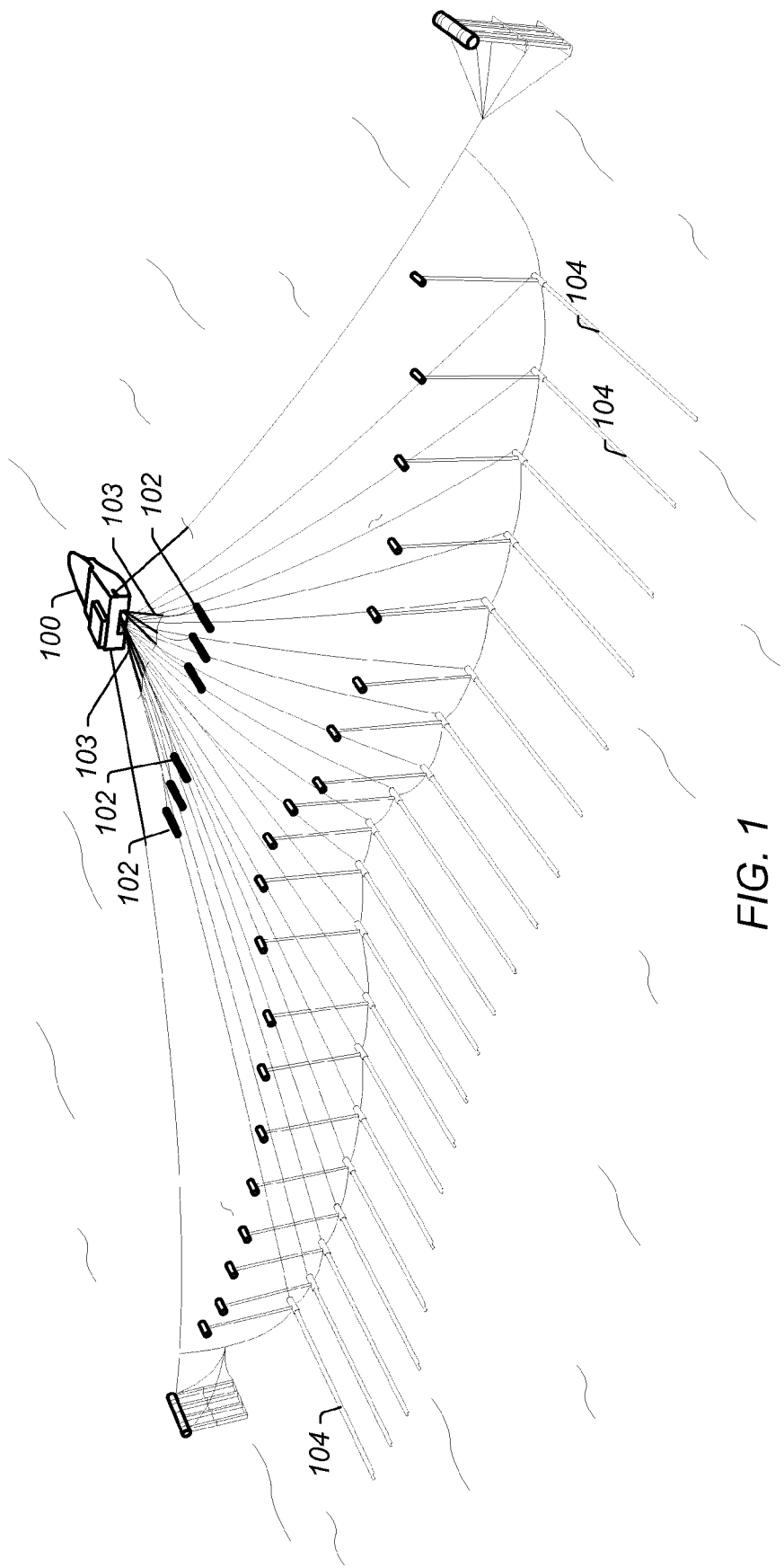
FIG. 1 is a diagram of one embodiment of an arrangement for conducting a marine geophysical survey using an array of towed submerged streamers.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The present disclosure is directed to method and apparatus embodiments in which a remotely operated vehicle (ROV) in a marine environment is used to facilitate cleaning of submerged equipment. As used herein, a "remotely operated vehicle" refers to an apparatus that is submersible in water, and that is capable of being controlled from a distance. In this context, the "remote operation" of the vehicle connotes that commands for the vehicle may originate from a location outside of the vehicle itself, such as from a computer system or operator located on a nearby vessel.

In one embodiment, an ROV may be configured to attach a streamer cleaning unit (SCU) to a submerged streamer. As used herein, a "streamer cleaning unit" refers to an apparatus that is configured, when attached to a streamer, to facilitate cleaning of the streamer without further operator intervention. Examples of such SCUs may be found in U.S. Pat. No. 7,409,919 by Hoogeveen et al. and U.S. Pat. No. 7,145,833 by Hoogeveen, each of which is incorporated herein by reference. The SCU may be subsequently released from the ROV to perform a cleaning operation on the streamer. Subsequent to the SCU completing the cleaning operation, the ROV may re-attach to the SCU and remove it from the streamer. In another embodiment, the ROV may be configured to receive a cleaning attachment. A cleaning operation may be performed by maneuvering the ROV into close proximity with the submerged streamer. After attaching the cleaning apparatus to the streamer, the ROV may propel the streamer along its length. Upon completing the operation, the ROV may detach the cleaning apparatus from the streamer. The operations described above may be conducted with the streamer in movement while being towed behind a tow vessel.

Turning now to FIG. 1, a diagram of one embodiment of an arrangement for conducting a marine geophysical survey using an array of towed submerged streamers is shown. In the embodiment shown, tow vessel 100 is towing an array of submerged streamers 104. Examples of such streamers may be found in U.S. Pat. No. 7,834,632 by Tenghamn et al. and U.S. Pat. No. 8,098,542 by Hillesund et al., each of which is incorporated herein by reference. Each of the submerged streamers may include a number of seismic sensors, EM receivers, or a combination thereof. The types of sensors that may be implemented in a given streamer include (but are not limited to) hydrophones and geophones. The types of receivers that may be implemented in a given streamer include (but are not limited to) electrodes and magnetometers. Moreover, a given streamer may include more than one type of sensor (e.g., a combination of hydrophones and geophones) or receiver (e.g., a combination of electrodes and magnetometers). Various operational considerations may make certain streamer towing depths advantageous. In some embodiments, single sensor streamers 104 may be towed at depths between about 4 meters and 30 meters. In some embodiments, dual sensor streamers may be towed at depths between 15 and 30 meters.

Tow vessel 100 may also tow a number of sources 102 via tow cables 103. In some embodiments, sources 102 may be towed by another vessel (not shown). Sources 102 may include a variety of seismic sources, such as marine vibrators or air guns. Sources 102 may also include a variety of EM sources, such as antennas or magnetic coils. In some embodiments, sources 102 may transmit sound waves into the water, the echoes of which may be detected by the seismic sensors of the streamers 104. In some embodiments, sources 102 may transmit EM signals into the water, which may be detected by the EM receivers of the streamers 104. The sensors and receivers of streamers 104 may be electrically coupled to electronic equipment aboard tow vessel 100 that may be used to analyze geophysical data, such as received echoes or detected signals. Using the arrangement shown in FIG. 1, marine geophysical surveys may be conducted. Among the uses of information obtained from such surveys may be the identification of geological formations indicative of oil and/or natural gas deposits.

During the conduct of marine geophysical surveys, equipment may at times become obstructed. For example, barnacle growth on streamers may occur during the conduct of marine geophysical surveys, particularly in certain geographic locations. When obstructions such as barnacles are attached to the streamers, the sensitivity of the sensors and receivers contained therein may be reduced. This in turn can adversely affect the data collected in the survey. Accordingly, cleaning of the streamers may be periodically performed in order to remove obstructions from the streamers 104 and thus to increase the effectiveness of a survey in progress.

Figure 2:
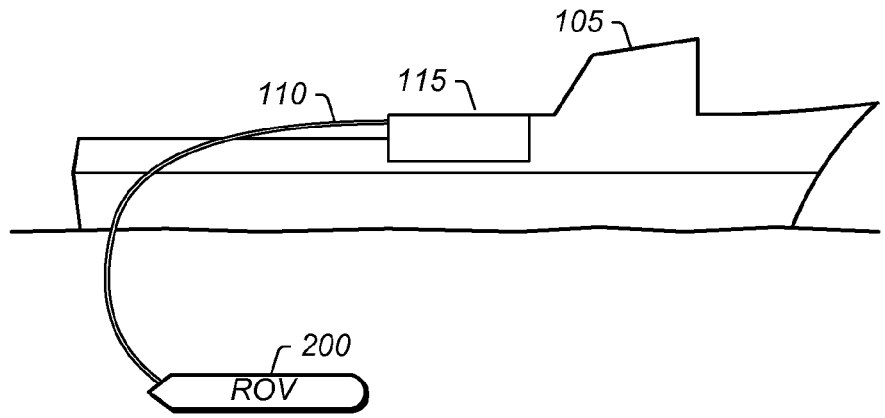
FIG. 2 is a diagram of one embodiment of a chase vessel and a remotely operated vehicle (ROV) controlled therefrom.

Cleaning of survey equipment (e.g., streamers 104, sources 102, or source cables 103) as discussed below may be facilitated by the use of an ROV. Turning now to FIG. 2, a diagram of one embodiment of a chase vessel and an ROV controlled therefrom is illustrated. In the embodiment shown, chase vessel 105 is a boat separate from tow vessel 100 discussed above, and may be used in the conduct of survey equipment cleaning operations. An ROV 200 is tethered to chase vessel 105 by a cable 110 in the illustrated example. Cable 110 may be used to transfer signals between ROV 200 and a control unit 115 located on chase vessel 105. An operator at control unit 115 may maneuver ROV 200 using various controls that generate commands sent to ROV 200 via cable 110. Similarly, various types of feedback (e.g., visual, audio, etc.) may be relayed from ROV 200 to control unit 115. Cable 110 may be of sufficient length to allow ROV to traverse the entire length of a streamer while the chase vessel is at a distance and/or relatively stationary with respect to the streamer.

Figure 3A:
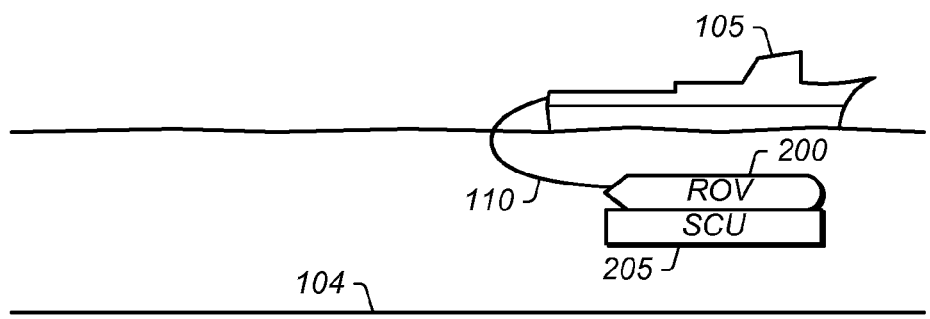
FIGS. 3A and 3B are diagrams illustrating one embodiment of a ROV attaching a streamer cleaning unit to a submerged streamer being towed behind a boat.
Figure 3B:
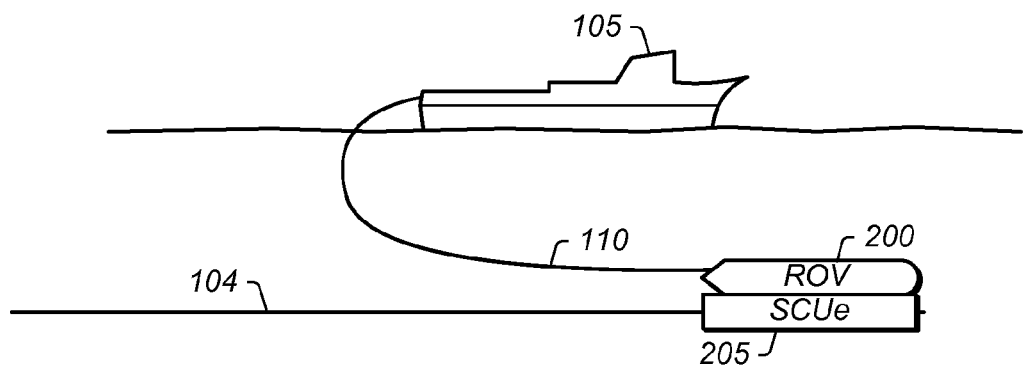

FIGS. 3A and 3B are diagrams illustrating one embodiment of a ROV attaching a streamer cleaning unit to a submerged streamer being towed behind a boat. In FIG. 3A, an SCU 205 has been attached to ROV 200. The attachment of the ROV 200 to SCU 205 may occur either with at least one of them above the waterline or with both submerged in the water. Under control of an operator at control unit 115, ROV 200, with SCU 205 attached thereto, may be maneuvered to a streamer 104 to be cleaned while the streamer is submerged and being towed behind a tow vessel 100.

In FIG. 3B, ROV 200 has been maneuvered into position near streamer 104. More particularly, ROV 200 has been maneuvered into position to attached SCU 205 to the submerged streamer 104. In this particular example, ROV 200 has been maneuvered to attach SCU 205 to a forward end (e.g., the end closest to the tow vessel) of streamer 104. After SCU 205 has been attached to streamer 104, ROV 200 may release the SCU 205 to commence a cleaning operation. Since SCU 205 is attached to streamer 104 while both are submerged, there no need to bring streamer 104 to the surface.

Figure 4:
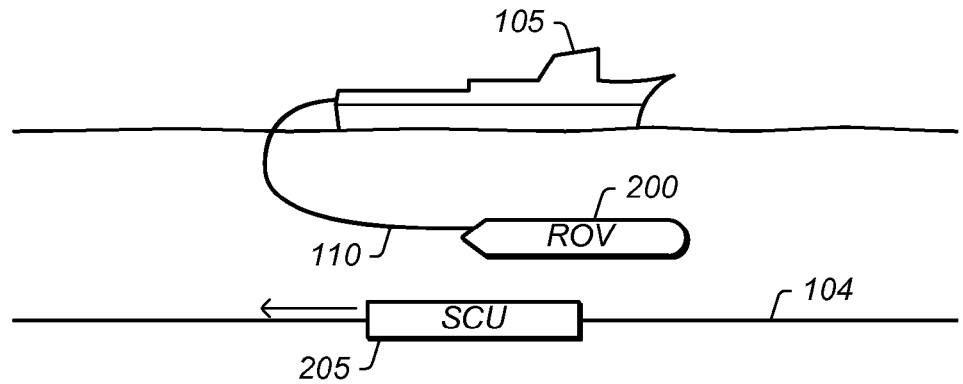
FIG. 4 is a diagram illustrating one embodiment of an SCU propelling itself along a streamer to conduct a cleaning operation.

FIG. 4 illustrates the streamer cleaning operation using SCU 205. In the illustrated example, ROV 200 has released SCU 205 subsequent to its attachment to streamer 104. Upon its release, the illustrated embodiment of SCU 205 is propelled from the forward end of streamer 104 to the rear end by hydrodynamic drag. As the SCU 205 progresses down streamer 104, barnacles and other obstructions may be removed.

Figure 5:
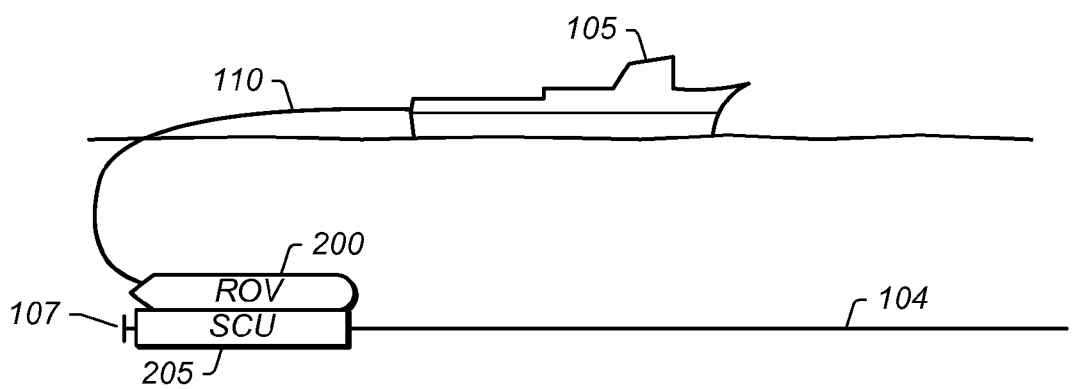
FIG. 5 is a diagram illustrating one embodiment of an ROV retrieving an SCU from a submerged streamer towed behind a boat.

In the example shown in FIG. 5, SCU 205 has reached the end of streamer 104. Streamer 104 includes a stopper 107 to hold SCU 205 in place while ROV 200 is maneuvered into position for retrieval. In the illustrated example, ROV 200 has been maneuvered into place in order to re-attach to SCU 205. Upon re-attachment of SCU 205 to ROV 200, SCU 205 may be removed from streamer 104. ROV 200 may then be maneuvered into position to attach SCU 205 to another streamer 104, or may be maneuvered back to chase vessel 105 where it may be taken on board.

Figure 6:
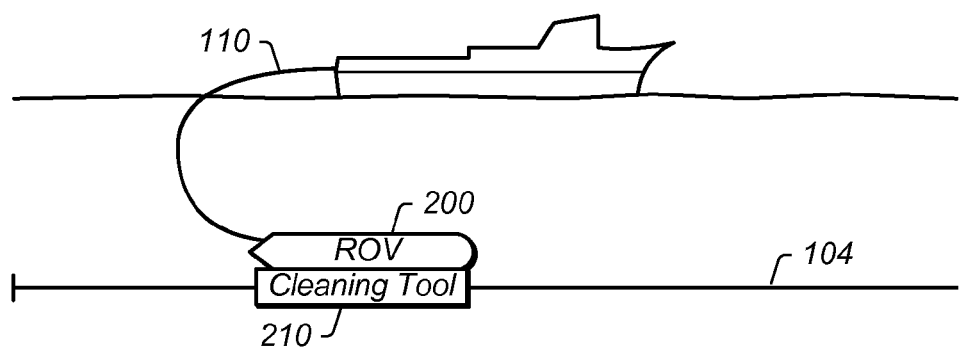
FIG. 6 is a diagram illustrating one embodiment of an ROV conducting a cleaning of a submerged streamer using an attached cleaning apparatus.

FIG. 6 illustrates another type of cleaning operation that may be facilitated by an embodiment of ROV 200. In this example, ROV 200 has a cleaning tool 210 attached thereto. In one embodiment, ROV 200 may be configured for attachment of either SCU 205 or cleaning tool 210, both of which may be removable subsequent to attachment. Cleaning tool 210 may be arranged for a more thorough cleaning of a streamer 104 relative to the cleaning performed using SCU 205. Furthermore, ROV 200 may remain attached to cleaning tool 210 throughout the operation of cleaning a streamer 104. To perform the cleaning operation, ROV 200 may be maneuvered into close proximity to streamer 104 such that cleaning tool 210 may be attached to the streamer. ROV 200 may then propel cleaning tool 210 along the length of streamer 104, and may make multiple passes if desired. Upon completion of the cleaning operation, ROV 200 may detach cleaning tool 210 from streamer 104.

Figure 7:
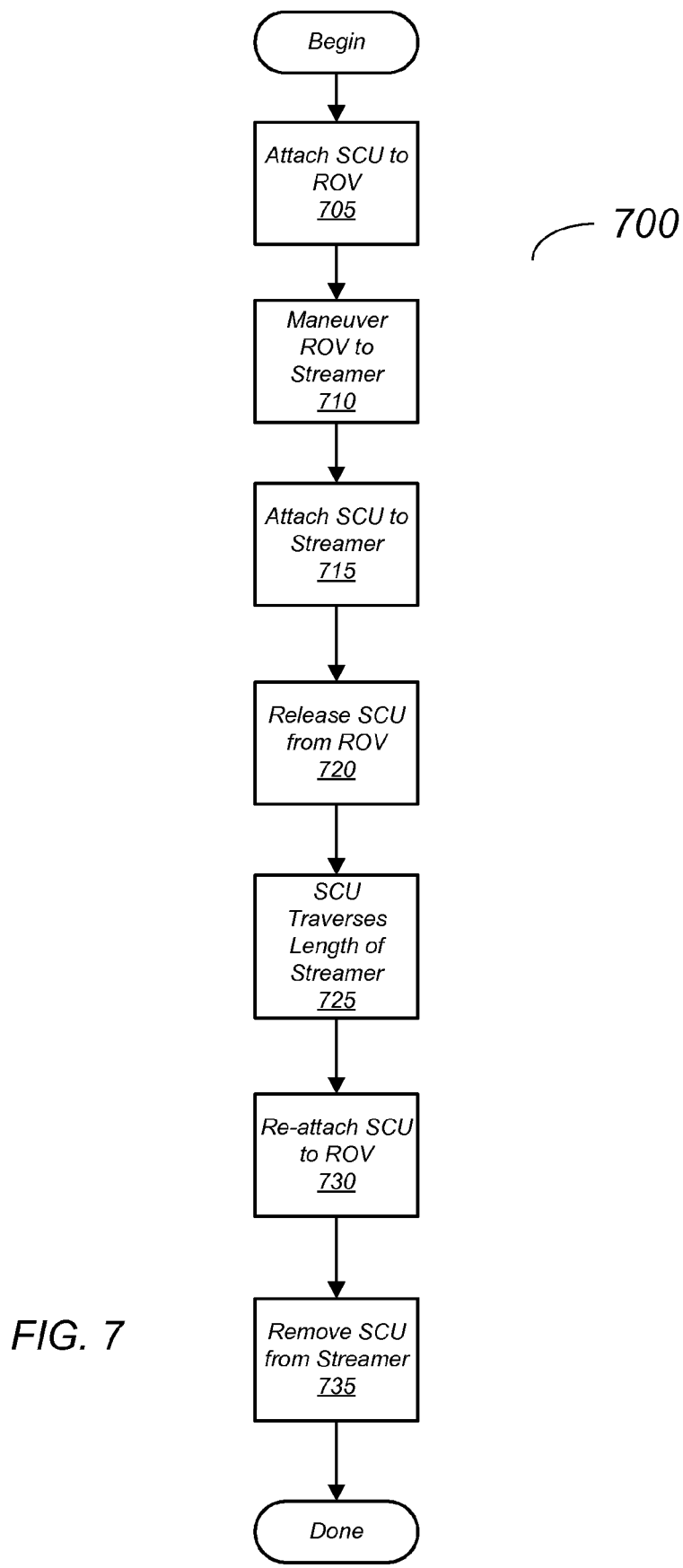
FIG. 7 is a flow diagram of one embodiment of a method for conducting a cleaning of a submerged, towed streamer using an ROV and a streamer cleaning apparatus.

Turning now to FIG. 7, a flow diagram of one embodiment of a method for conducting a cleaning of a submerged, towed streamer using an ROV and a streamer cleaning apparatus is shown. In the embodiment shown, method 700 begins with the attachment of an SCU to an ROV (block 705). The attachment of the SCU to the ROV may be performed while both are in the water and submerged, although it is also possible and contemplated that an SCU may be attached to an ROV prior to submerging them in water.

With the SCU attached to the ROV, the ROV may then be maneuvered into close proximity to the streamer to be cleaned (block 710). In one embodiment, the ROV may be maneuvered into a position near the end of the streamer closest to the tow boat. When in close enough proximity, the SCU may be attached to the streamer (block 715). The SCU may be released from the ROV after having been securely attached to the streamer (block 720).

After the ROV has released the SCU, cleaning of the streamer may commence. The SCU discussed in this embodiment is a self-propelled unit, and may traverse the length of the streamer (block 725). After the SCU has reached the end of the streamer, it may be held in place by a stopper in order to prevent it from becoming unintentionally de-attached from the streamer. The ROV may be maneuvered into position for re-attachment of the SCU (block 730). After re-attachment to the ROV, the SCU may be removed from the streamer for retrieval or for cleaning of another streamer.

Figure 8:
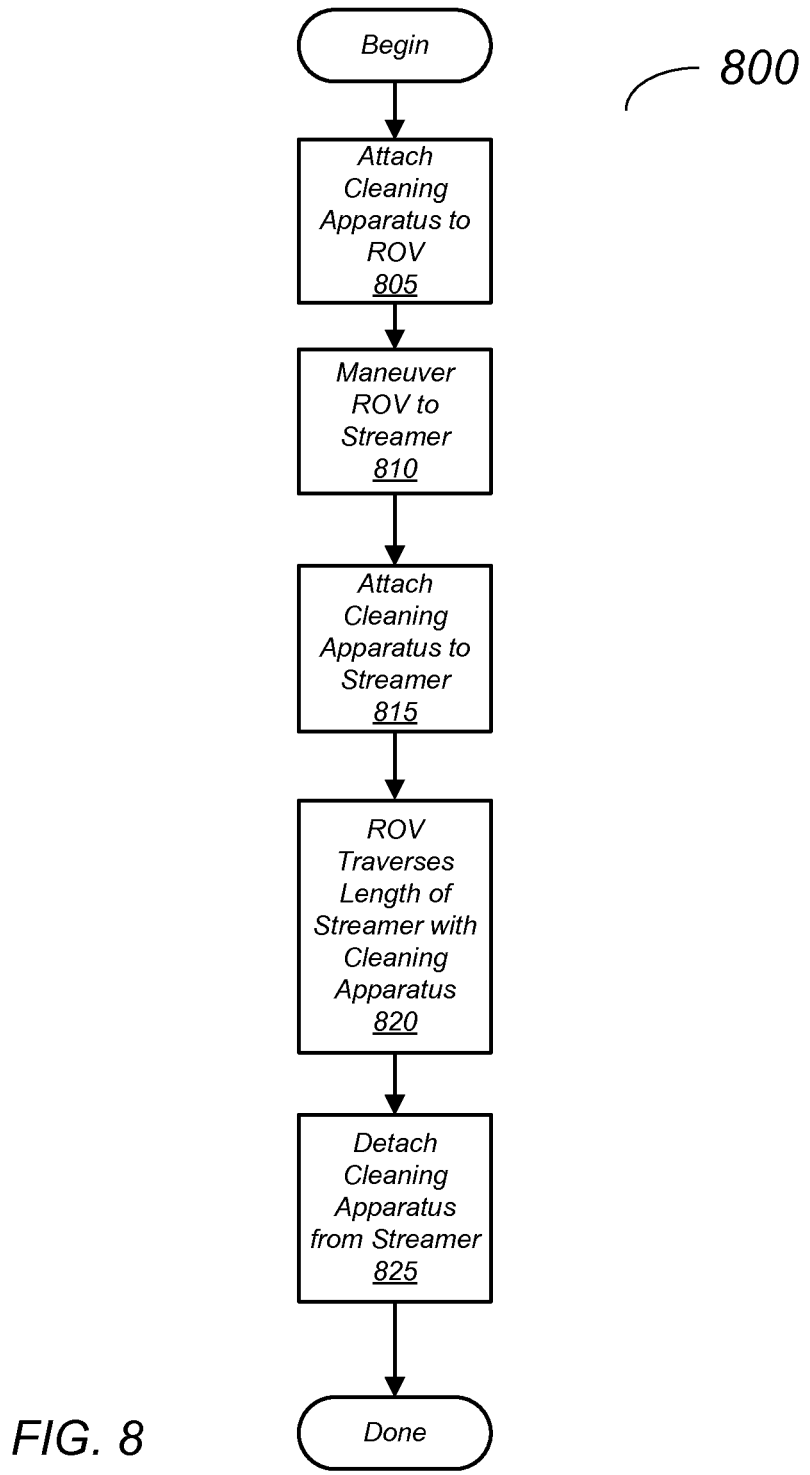
FIG. 8 is a flow diagram of one embodiment of a method for conducting a cleaning of a submerged, towed streamer using an ROV and an attached cleaning apparatus.

FIG. 8 is a flow diagram of one embodiment of a method for conducting a cleaning of a submerged, towed streamer using an ROV and an attached cleaning apparatus. Method 800 begins with the attachment of a cleaning apparatus to an ROV (block 705). After the cleaning apparatus is securely attached, the ROV may be maneuvered to a streamer to be cleaned (block 810). The ROV may maneuver into such a position that the cleaning apparatus is attached to the streamer (block 815).

Upon attaching the cleaning apparatus to the streamer, the cleaning operation may commence. The ROV may propel the cleaning apparatus along the streamer, traversing its length (block 820). Upon reaching the end of the streamer (or the end of the portion to be cleaned), the ROV may detach the cleaning apparatus from the streamer (block 825). The cleaning apparatus may then be returned to a chase vessel for retrieval, or the ROV may be maneuvered into position to clean another streamer.

Figure 9:
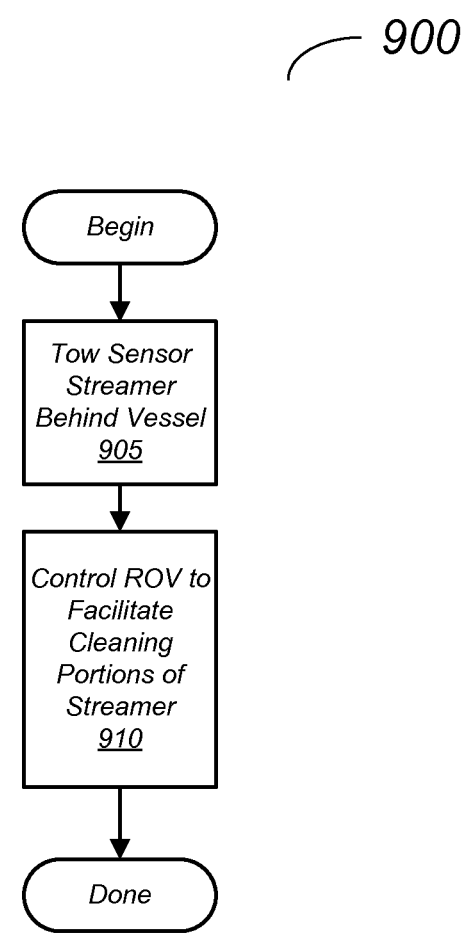
FIG. 9 is a flow diagram of one embodiment of a method for using an ROV to facilitate cleaning of a streamer.

FIG. 9 is a flow diagram of a method for using an ROV to facilitate cleaning of a streamer. In method 900, a streamer is towed behind a survey vessel (block 905). The streamer may be one of a number of streamers in an array, although embodiments are possible and contemplated wherein only a single streamer is towed. The method further includes controlling an ROV to facilitate cleaning of the streamer (block 910). In some embodiments, other types of maintenance and repair work may also be facilitated by controlling the ROV.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method comprising:
towing a geophysical equipment behind a survey vessel; and
controlling a remotely operated vehicle (ROV) to facilitate cleaning portions of the geophysical equipment while the geophysical equipment is being towed, wherein the ROV is controlled via a cable connected to a chase vessel.

2. The method as recited in claim 1, wherein the ROV facilitates cleaning the geophysical equipment by cleaning the streamer using a cleaning apparatus coupled thereto.

3. The method as recited in claim 1, wherein the geophysical equipment is a streamer.

4. The method as recited in claim 3, wherein the ROV facilitates cleaning the streamer by loading and unloading a streamer cleaning unit on to the streamer.

5. The method as recited in claim 4, further comprising the ROV loading the streamer cleaning unit onto a first end of the streamer.

6. The method as recited in claim 5, further comprising the streamer cleaning unit facilitates cleaning by propelling itself to a second end of the streamer.

7. The method as recited in claim 1, wherein the ROV is used to facilitate cleaning the geophysical equipment without surfacing the streamer.

8. The method as recited in claim 3, wherein the streamer is being towed at a depth of between about 4 meters and 30 meters.

9. An apparatus comprising:
an interface unit configured to receive commands from a remote location; and
a cleaning unit configured to facilitate, in response to the received commands, cleaning portions of a geophysical equipment that is being towed in water behind a survey vessel;
wherein the interface unit is configured to be coupled to a cable and configured to receive the commands via the cable from a remotely located control unit.

10. The apparatus as recited in claim 9, wherein the geophysical equipment is a streamer.

11. The apparatus as recited in claim 10, wherein the apparatus is configured to attach a self-propelled cleaning apparatus to the streamer, and further configured to release the self-propelled apparatus.

12. The apparatus as recited in claim 11, wherein the apparatus is configured to re-attach the self-propelled cleaning apparatus and further configured to remove the self-propelled cleaning apparatus from the streamer.

13. The apparatus as recited in claim 9, wherein the apparatus is configured to facilitate cleaning of the geophysical equipment using a cleaning attachment coupled to the apparatus.

14. The apparatus as recited in claim 13, wherein the geophysical equipment is a streamer, and the apparatus is configured to propel the cleaning attachment along the streamer.

15. A method comprising:
towing a geophysical equipment in water behind a survey vessel; and
cleaning the geophysical equipment while the geophysical equipment is submerged in the water and is being towed, wherein said cleaning comprises a remotely located control unit sending commands to a remotely operated vehicle (ROV) in order to correct a lack of antecedent basis problem via a cable.

16. The method as recited in claim 15, wherein the geophysical equipment is a streamer.

17. The method as recited in claim 16, wherein the cleaning includes the ROV propelling a cleaning apparatus along the streamer.

18. The method as recited in claim 16, wherein the cleaning includes the ROV attaching a cleaning apparatus to a first end of the streamer while the streamer array is submerged and being towed.

19. The method as recited in claim 18, further comprising the ROV releasing the cleaning apparatus subsequent to attaching the cleaning apparatus to the streamer.

20. The method as recited in claim 19, further comprising the cleaning apparatus propelling itself from the first end of the streamer to a second end of the streamer.

21. The method as recited in claim 20, further comprising:
- the ROV re-attaching to the cleaning apparatus at the second end of the streamer;
- the ROV detaching the cleaning apparatus from the streamer subsequent to said re-attaching.

22. The method as recited in claim 15, wherein the geophysical equipment is being towed at a depth of between about 4 meters and 30 meters.

\* \* \* \* \*